Figure 1:
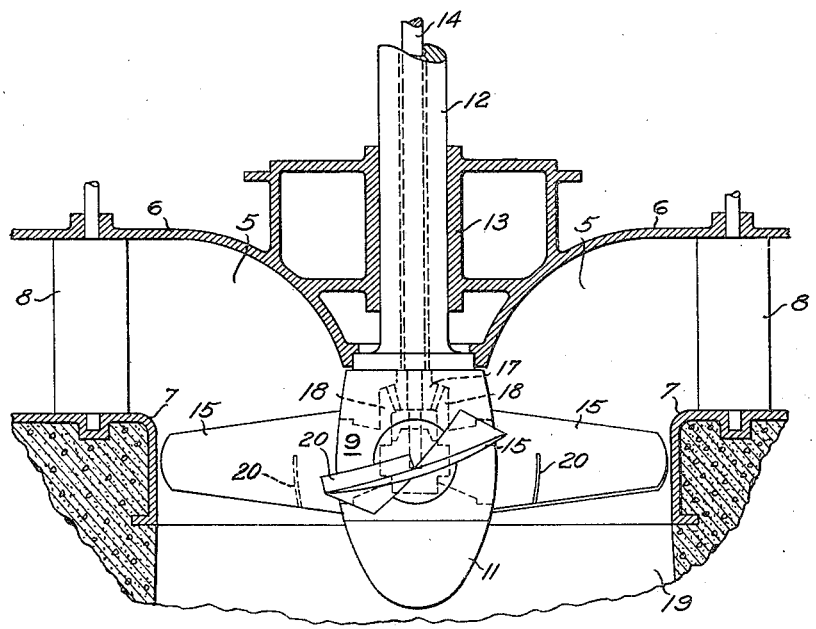

Jan. 17, 1950 N. A. LANDT 2,494,623
HYDRAULIC TURBINE
Filed Jan. 6, 1945

Inventor
Newton A. Landt
by W. A. Lieber
Attorney

Patented Jan. 17, 1950

2,494,623

UNITED STATES PATENT OFFICE 2,494,623

HYDRAULIC TURBINE

Newton A. Landt, Wisconsin Dells, Wis., assignor to Allis-Chalmers Manufacturing Company, Milwaukee, Wis., a corporation of Delaware Application January 6, 1945, Serial No. 571,577

3 Claims. (Cl. 253—148)

The present invention relates generally to improvements in hydraulic turbines and relates more particularly to improvements in the construction of hydraulic turbine runners.

It is an object of my invention to provide improved means for stabilizing hydraulic turbine draft tube operation and for reducing cavitation and pitting of the turbine parts.

Water is known to contain dissolved and entrained gases in varying amounts dependent on the pressure and temperature of the water and the surrounding atmosphere as well as the accumulation of dissolved solids therein. In addition, water flowing as a stream is generally sufficiently agitated to cause some degree of air entrainment, and undissolved solids which may be carried by the flowing water may release gases which are also dissolved or entrained by the water. As long as the stream continues to flow in its normal course, the water retains its gaseous content; but when the water is subjected to a change from a relatively high pressure to a substantially lower pressure, the entrained gases are released in proportion to the change in absolute pressure and temperature and the extent of gaseous content. Such action and the resultant liberation of gases occurs in a hydraulic turbine wherein the water passes through the turbine runner under pressure and is discharged into the draft tube where a state of vacuum exists.

The water discharging from a hydraulic turbine of the reaction type is subjected to centrifugal force, and consequently the natural tendency of the water flow is to produce a vortex in the draft tube, thereby causing the liberated gases to collect in the low pressure area below the runner hub. In addition to the vortex formed by the whirling water as it is discharged from the turbine runner, there is little or no discharge of water in the region immediately below the runner hub or central runner vane portion of a reaction turbine. Therefore, since the pressure at the inlet side of the turbine runner is above atmospheric pressure to an extent dependent on the head of the reservoir and there is a partial vacuum below the runner, the gases dissolved and entrained in the water are liberated upon passage through the runner from high to low pressure areas, collecting in the central portion of the draft tube to produce a gas bubble of material area extending a substantial distance into the draft tube. As these gases are released, they continue to collect and occupy an increasing space in the draft tube until such time as the friction of the water in the vortex causes collapse of the gas bubble and carries the gases out of the draft tube. Upon collapse of the bubble and removal of the gases, a new bubble is formed and collapsed in like manner, such collection and collapse of gas bubbles continuing in a recurring cycle at a frequency dependent on the gas content of the water and the rate of water flow through the turbine.

It has been observed that there is considerable undesirable vibration as well as variation in output attendant the normal operation of hydraulic turbines, and cavitation, including corrosion and pitting, of various turbine parts has long been a serious problem. From observation and study of turbine operation, it is believed that the recurring cycle of bubble collection and collapse causes a corresponding cycle of variations in turbine output due to the fact that the gas bubble collection restricts the available area for water discharge in the draft tube and collapse of the bubble removes this restriction. It is also believed that the bubble collection and collapse cycle is responsible for the vibration disturbing the normal operation of a hydraulic turbine. Furthermore, analysis of liberated gases extracted from the draft tube below and adjacent the runner of a turbine shows such gases to be of a mixture considerably richer in oxygen than ordinary air, and the presence of such oxygen mixture on the continually wet surface of a turbine runner inevitably aids corrosion or pitting.

The foregoing occurrences and harmful results have been recognized by many persons skilled in the art and many attempts have been made to overcome the same, some of these efforts meeting with more or less limited success. It has heretofore been proposed to vent the space immediately below the runner hub in the draft tube to atmosphere, thereby permitting free access of air to the low pressure area wherein gas bubble collection and collapse normally occur. It has likewise been heretofore proposed to admit regulated quantities of air as well as to force air under pressure to this region. While air admission to the region of low pressure has been shown to be effective in destroying the vacuum and substantially eliminating bubble formation and collapse when properly admitted and controlled, it has been found detrimental to power output and turbine efficiency to fill voids in the draft tube with elastic fluids, thereby decreasing the area of the draft tube continuously available for free discharge of water from the turbine runner. Furthermore, provision for the introduction of air to the proper region must necessarily be made, often with considerable expense and undesirable interference with the turbine construction. It has also been heretofore proposed to provide means for equalizing the flow of water over the runner vanes and the distribution of the water passing through the turbine draft tube. However, such heretofore proposed means consisted of additional structure interposed within the draft tube below the runner; and although such structures have produced satisfactory results insofar as stabilization of turbine operation and reduction of vibration as well as cavitation and pitting are concerned, provision of the additional necessary structure is quite costly and means for mounting such structure within the draft tube in order to cause the least possible interference with the flow of water must be provided.

It is therefore a further object of my invention to provide improved means for utilizing the water passing through a turbine runner and draft tube to equalize the pressure across the entire area of the turbine draft tube and to eliminate formation and collapse of voids therein.

It is another object of the invention to provide improved means for stabilizing and increasing the power output and efficiency of a hydraulic turbine without decreasing the area of the draft tube continuously available for discharge of water from the turbine runner.

It is an additional object of the present invention to provide improved means for stabilizing hydraulic turbine operation and for minimizing vibration, cavitation and pitting by equalizing the flow of water over the runner vanes and the distribution of the water passing through the turbine draft tube.

It is another object of my invention to provide improved means formed on each runner vane of a hydraulic turbine for partially resisting the centrifugal force acting on the water during its passage through the runner and for guiding some of the water toward the center of the draft tube.

It is still another object of the invention to provide improved means for minimizing the effect of liberation of gases from water passing through a hydraulic turbine and for preventing accumulation of such gases, which means may be readily and economically applied to any turbine of the reaction type without necessity of redesigning the turbine or providing any additional structure whatsoever in the draft tube below the runner.

A further object of my present invention is to provide an improved runner with vanes having means on the active surfaces thereof for deflecting a portion of the water passing over the runner toward the center of the draft tube, thereby tending to equalize the velocity of water as it passes through the runner and likewise tending to equalize the pressure across the entire area of the turbine draft tube.

Additional objects and advantages of the present invention will be apparent from the following detailed description.

A clear conception of the present improvement and of the mode of constructing and utilizing devices built in accordance with the invention may be had by referring to the drawing accompanying and forming a part of this specification wherein like reference characters designate the same or similar parts in the several views.

Figure 2:
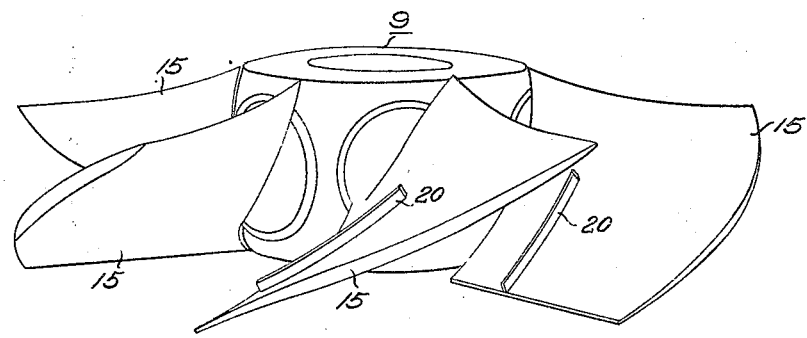

Fig. 1 is a somewhat diagrammatic vertical sectional view through a portion of a hydraulic turbine of the adjustable vane propeller type and including a runner embodying my improved design; and Fig. 2 is a somewhat enlarged perspective view of an adjustable vane runner constructed in accordance with my invention.

Referring to the drawing, the usual propeller type hydraulic turbine has an annular water passage 5 formed by a head cover 6 and a discharge ring 7. Adjustable guide vanes 8 control the flow of water to the passage 5 from which the water flows through an adjustable vane runner generally indicated at 9. The runner 9 is provided with a conical hub 11 which may be secured to a tubular shaft 12 in any suitable manner. The shaft 12 is journaled for rotation in a bearing 13 and is connected at its upper end to a generator, not shown. Extending through the shaft 12 is an adjusting rod 14 associated with suitable well-known adjusting mechanism, not shown, at its upper extremity. Adjustment of the runner vanes or blades 15 may be effected by the rod 14 through any suitable well-known means diagrammatically shown herein, for purposes of illustration, as comprising a bevel pinion 17 carried by the lower extremity of the adjusting rod 14 and coacting with gear segments 18 of the vanes 15. The water passing through the runner is discharged into a draft tube 19 which may be of well-known construction.

During normal operation, the runner 9 receives the flow of water under pressure through the guide vanes 8 and discharges the water into the draft tube 19. When in operation, the turbine runner is under the pressure of a full head of water on the inlet side of the runner vanes and the discharge side of the runner is under a vacuum produced by the draft tube. In its discharge from the runner, the water forms a vortex in which a substantially annular body of water is whirled to some extent by centrifugal force into contact with the walls of the draft tube at relatively high pressure, approaching and often reaching spouting velocity, and causing a portion of the draft tube within the annulus to assume a very low relative pressure. This low pressure area in the draft tube is normally approximately equal in diameter to the runner hub 11, extending downwardly from beneath the hub a considerable distance into the draft tube. The degree of whirl and velocity of the water across the runner and within the draft tube, and consequently the pressures established below the runner, may vary in accordance with the settings of the guide or gate vanes 8 and the runner vanes 15 which are adjustable as aforesaid. As the whirling water reaches spouting velocity, it tends to vaporize and oxygen is thereby released; and in addition, the gases dissolved and entrained in the water are likewise liberated upon passage to the low pressure area below the runner. These gases are normally forced to the low pressure area in the draft tube, and in reaction type hydraulic turbines of the usual design, the liberated gases tend to form a gas bubble on the runner hub as heretofore described.

To equalize the pressure across the entire area of the draft tube and thereby effectively prevent collection of the liberated gases and the formation and collapse of a gas bubble on the runner hub, I provide a deflector plate or strip 20 on the active face of each runner vane 15. By "active face," I mean the water receiving surface of the runner vane. The strips 20 are relatively narrow and are preferably formed on the trailing portion of the active surface of each vane, extending from the longitudinal center line of each runner vane to the trailing or discharge edge thereof. These strips may be welded or otherwise secured to the trailing portion of the runner vanes or may be formed as an integral part of the vanes in the manufacture thereof. These deflector plates form an auxiliary guide and serve to deflect or guide a sufficient amount of the water passing over the active runner surface to the central part of the draft tube and over the exterior of the projecting hub to substantially raise the pressure at that point in the draft tube and prevent the formation of voids. The exact size and position of the deflector strips on the runner vanes to accomplish the most effective results without impairing the output or efficiency of the turbine varies according to the size and design of the turbine, particularly the length and number of the vanes and the diameter and depth of the hub. In any event, these strips should be of sufficient size and so located as to produce only a sufficient deflection of water to the center of the draft tube as to secure re-entrainment therewith of the released gases and prevent formation and collapse of gas bubbles without material interference with the normal flow of water through the runner. Since there is, to date, no available formula which is generally applicable for determining the particular size and location of these deflector strips due to the numerous factors affecting each embodiment, the size and position thereof effective to produce the best results can only be determined by test.

As an example, a turbine of the adjustable vane propeller type having a runner one-hundred and twelve inches in diameter composed of four vanes or blades each thirty-seven inches in length and thirty-four inches wide and having a hub of thirty-eight inches in diameter depending approximately eighteen inches below the runner was found to operate most satisfactorily with a deflector strip approximately seventeen inches long, four inches high and one-half inch thick welded to the active surface of each runner vane about thirty-one inches out from the center of the runner. The strips were bent to approximately a thirty-one inch radius and each strip extended from the center line of its runner vane to the trailing or discharge edge of the vane. During operation of this unit, a slight but noticeable increase in efficiency and power output accompanied by a decidedly noticeable decrease in vibration or hammering and variation in output was obtained by reason of the deflector strips or auxiliary guides. After continuous operation of the unit for a substantial period of time such as would enable definite conclusions to be drawn as to the effectiveness of the device in successfully eliminating cavitation and pitting, careful examination of the turbine parts normally subjected to cavitation and pitting shows almost complete absence of any evidence of such action.

From the foregoing detailed description, it will be apparent that the present invention provides means tending to equalize the pressure across the entire diameter of the runner as well as in the draft tube below the runner. By the provision of the deflector strips or plates, the flow of a portion of the water from the annulus of the vortex is effectively directed down the center of the draft tube, thereby causing continuous movement of the released gases from adjacent the runner by reentrainment of the liberated gases in a constant flow of water through the center of the draft tube and resulting in improved operating efficiency. The means disclosed herein reduces the rate of liberation of the gases and makes the entire area of the draft tube effective for removing the fluent medium from below the runner and has proven highly effective and economical in actual commercial use. Power stabilization, increased efficiency, reduction of vibration and practical elimination of cavitation and pitting have all been found to result from the improved means herein disclosed. Obviously since greater outputs may be obtained for a given runner diameter, a more economical setting of the turbine is possible. It should be noted that the improved means is extremely simple and may be readily applied to any existing units as well as future installations without change in the design of the turbine. The strips may be welded or otherwise secured to the active or guiding surface of the runner vanes where they are readily accessible upon shutdown of the unit, and these strips do not interfere with or in any way affect the adjustability of the blades of an adjustable vane propeller type turbine.

Although the present invention has been shown and described as consisting of a strip or plate secured to the trailing portion of the active surface of an adjustable vane of a propeller type hydraulic turbine, such deflector means may obviously be embodied directly into the design of the vanes as an integral part thereof and could likewise be applied to any type of reaction turbine without departing from the scope of the invention. It should therefore be understood that it is not desired to limit my present invention to the exact details of construction and the particular application herein shown and described, for various modifications within the scope of the claims may occur to persons skilled in the art.

It is claimed and desired to secure by Letters Patent:

1. In a hydraulic turbine: a turbine runner adapted to be driven by water passing therethrough, said runner comprising vanes extending laterally from a central hub and being of the type for cooperation with a coaxially whirling body of water fed thereto and said vanes being carried by said hub at respective places spaced axially from the terminal end of said hub, said hub tapering downstream from said runner toward said terminal end; means including conduit means and guide vanes for feeding such a cooperating body of water against the upstream faces of said vanes to cause rotation of said runner; a draft tube on the downstream side of said runner into which water from said turbine runner is dischargeable, and into which said hub extends; and means for altering the normal free flow of water along the upstream faces of said vanes to cause water to flow along the upstream inner peripheral faces of said vanes to the discharge edges thereof and thence along the exposed surface of said hub, said means comprising a fin on each of said vanes on the respective upstream faces thereof, each fin being disposed between the inner and outer peripheries of its respective vane.

2. In a hydraulic turbine: a turbine runner adapted to be driven by water passing therethrough, said runner comprising vanes extending laterally from a central hub and being of the type for cooperation with a coaxially whirling body of water fed thereto; means including conduit means and guide vanes for feeding such a cooperating body of water against the upstream faces of said runner vanes to cause rotation of said runner; a draft tube on the downstream side of said runner into which water from said runner is dischargeable; and means for altering the normal free flow of water adjacent the upstream faces of said runner vanes, said means comprising a fin on each of said vanes on the respective upstream faces thereof, each fin being disposed between the inner and outer peripheries of its respective vane and extending transversely of the vane from approximately the trailing margin thereof to and terminating at a point intermediate the trailing and leading margins thereof.

3. In a hydraulic turbine: a turbine runner adapted to be driven by water passing therethrough, said runner comprising vanes extending laterally from a central hub and being of the type for cooperation with a coaxially whirling body of water fed thereto; means including conduit means and guide vanes for feeding such a cooperating body of water against the upstream faces of said runner vanes to cause rotation of said runner; a draft tube on the downstream side of said runner into which water from said runner is dischargeable; and means for altering the normal free flow of water adjacent the upstream faces of said runner vanes, said means comprising a fin on each of said vanes on the respective upstream faces thereof, each fin being disposed between the inner and outer peripheries of its respective vane and extending transversely of the vane from approximately the trailing margin thereof to and terminating at a point approximately midway between the trailing and leading margins thereof.

NEWTON A. LANDT.

REFERENCES CITED

The following references are of record in the file of this patent:

UNITED STATES PATENTS

| Number | Name | Date |
|---|---|---|
| 546,663 | Haskins et al. | Sept. 24, 1895 |
| 560,300 | McCormick | May 19, 1896 |
| 1,129,934 | Wiedling | Mar. 2, 1915 |
| 1,837,569 | Moody | Dec. 22, 1931 |
| 2,327,453 | Presser | Aug. 24, 1943 |

FOREIGN PATENTS

| Number | Country | Date |
|---|---|---|
| 99,820 | Switzerland | July 2, 1923 |